United States Patent [19]

Wason et al.

[11] Patent Number: 4,969,130

[45] Date of Patent: Nov. 6, 1990

[54] SYSTEM FOR MONITORING THE CHANGES IN FLUID CONTENT OF A PETROLEUM RESERVOIR

[75] Inventors: Cameron B. Wason, Plano; Geoffrey A. King, Garland; Edward L. Shuck, Dallas, all of Tex.; E. Allen Breitenbach, Littleton; Robert C. McFarlane, Englewood, both of Colo.

[73] Assignees: Scientific Software Intercomp, Inc., Denver, Colo.; Halliburton Geophysical Services, Inc., Houston, Tex.

[21] Appl. No.: 414,928

[22] Filed: Sep. 29, 1989

[51] Int. Cl.[5] .............................................. G01V 1/28
[52] U.S. Cl. ........................................ 367/73; 367/37
[58] Field of Search ........................... 367/73, 37, 38; 364/421; 73/151

[56] References Cited

U.S. PATENT DOCUMENTS

| | | | |
|---|---|---|---|
| 3,739,871 | 6/1973 | Bailey | 367/37 |
| 3,921,126 | 11/1975 | Waters | 367/40 |
| 3,946,356 | 3/1976 | Anstey | 367/73 |
| 4,214,226 | 7/1980 | Narasimhan et al. | 367/27 |
| 4,280,200 | 7/1981 | Silverman | 367/37 |
| 4,282,587 | 8/1981 | Silverman | 367/37 |
| 4,298,967 | 11/1981 | Hawkins | 367/57 |
| 4,415,999 | 11/1983 | Moeckel et al. | 367/73 |
| 4,479,204 | 10/1984 | Silverman | 367/47 |
| 4,524,434 | 6/1985 | Silverman | 367/37 |
| 4,679,174 | 7/1987 | Gelfand | 367/73 |
| 4,821,242 | 4/1989 | Hennington | 367/73 |

OTHER PUBLICATIONS

*Bright Spot in the Energy Picture*, Ocean Industry, Feb. 1974, 60–65 by Savit.
*Monitoring of Oil/Water Fronts by Direct Measurement*, SPE 18271 by Dunlop, King and Breitenbach, 63rd Annual Technical Conference & Exhibition of the Society of Petroleum Engineers, Houston, Tex., Oct. 2–5, 1988.
*The Range of Application of Reservoir Monitoring*, SPE 19853 by Breitenbach, King and Dunlop, 64th Annual Technical Conference & Exhibition of Petroleum Engineers, San Antonio, Tex., Oct. 8–11, 1989.

*Primary Examiner*—Ian J. Lobo
*Attorney, Agent, or Firm*—Hilary Pearson

[57] ABSTRACT

A system of monitoring the fluid contents of a petroleum reservoir, wherein a reservoir model is employed to predict the fluid flow in the reservoir, includes a check on the reservoir model by comparison of synthetic seismograms with the observed seismic data. If the synthetic output predicted by the model agrees with the observed seismic data, then it is assumed that the reservoir is being properly worked. If not then the reservoir model, in particular its reservoir description, is updated until it predicts the observed seismic response. The seismic survey may be periodically repeated during the productive life of the reservoir and the technique used to update the reservoir model so as to ensure that the revised reservoir description predicts the observed changes in the seismic data and hence reflects the current status of fluid saturations. Implementation of this invention results in more efficient reservoir management.

33 Claims, 4 Drawing Sheets

SYSTEM FOR MONITORING THE CHANGES IN FLUID CONTENT OF A PETROLEUM RESERVOIR

BACKGROUND OF THE INVENTION (1) Field of the Invention

This invention lies in the field of the production of fluids including petroleum, gas and viscous oils from geological formations by natural or special recoveries. More particularly, the invention relates to monitoring the total status of the fluid reservoir in the geological formations including pressures and fluid distributions and saturations.

(2) Description of Prior Art

In the past, reservoir modeling and simulation have been employed to determine the developing stream lines of a reservoir. It has been known that measurements of pressure in producing wells can be used to determine the status of fluid flow in a reservoir, provided lithologic configuration, structural configuration of the reservoir rocks and initial fluid distributions within the reservoir are all well known. However, in practice this information is generally very imperfectly known, often leading to an ambiguous situation in which well production profiles at a particular time may agree with reservoir simulation results even when the reservoir model is grossly incorrect. Use of such a reservoir model can result in serious inefficiencies in the recovery of fluids from the reservoir. Indeed, sometimes the observed data matches several different models. The prior art does not teach any independent validation mechanism or method of obtaining data of sufficiently high lateral resolution to provide the feedback necessary to change or validate the attributes of the reservoir model or to choose among competing models, and thereby to determine whether the model conforms to the actual inter-well subsurface reservoir conditions.

Recent improvements in analysis of seismic data have made it possible to detect the increased reflectivity of an interface with a geological formation that contains gas or a gas saturated liquid, the so-called "bright spot". U.S. Pat. No. 4,479,204 to Silverman utilizes this bright spot technique to monitor the boundaries of the zone of the oil or other liquid being obtained from a geological formation. Silverman teaches making a seismic survey to obtain a "snapshot" of the reservoir area at one time, injecting a gas-saturated fluid into the reservoir, and taking a second seismic "snapshot" at a later time. The presence and relative position of bright spots in successive seismic "snapshots" will indicate the movement of the gas-saturated injected liquid, and thus the boundaries of the oil remaining in the reservoir.

The Silverman method has the disadvantage of requiring the presence of gas in the injected fluid in order to sufficiently enhance the reflectivity to make the interface detectable. This may be difficult to provide, or may make the production process too expensive. The method will not be usable where there is a naturally occurring drive fluid which is not sufficiently gas-saturated to provide a sufficient increase in reflectivity over the production fluid to permit delineation of the boundary by bright spot detection. There is no suggestion how fluid boundaries could be detected in the absence of a gas-saturated drive fluid. Further, Silverman does not teach or suggest that his method could be used to improve and monitor reservoir modelling and simulation.

The present invention is capable of detecting the boundaries of the production fluid even when the second fluid is not gas-saturated. It provides a method for obtaining an accurate reservoir model and for providing the additional monitoring needed for effective control over the production life of the reservoir.

BRIEF SUMMARY OF THE INVENTION

It is important to the optimization of the hydrocarbon recovery process that the spatial location and relative saturation of the hydrocarbons and other naturally occurring or injected fluids be known; in addition it is important to have accurate knowledge of the lithological and structural configuration of the reservoir rocks.

This invention teaches a method of providing monitoring of the reservoir condition in such a way that discrepancies between predicted behavior and measured behavior can be used to modify and improve upon imperfect knowledge of the reservoir status.

Essentially this method requires an integrated scheme that includes the development and maintenance of the current status of the reservoir's detailed petrophysical model.

There are six main steps in the method:

1. Construct an initial reservoir model;
2. Using history matching and reservoir simulation, update the model to represent the reservoir at a later time;
3. Prepare synthetic seismograms for the model at the two different times, compute the differences between the seismograms and use the differential synthetic data to examine the effect of fluid movement in the reservoir model;
4. Obtain seismic survey data for the reservoir area at the initial and later time, the data being collected and processed in exactly the same way so that the seismic waveforms can be directly compared, and the differential seismic data used to detect fluid movement;
5. Compare the differential synthetic data to the differential seismic data to provide an estimate of changes in fluid distribution between the two times, and to provide an estimate of the mean reservoir permeability; and
6. Use the differential seismic data to select a reservoir model when history matching produces several competing models, and use the results of steps 4 and 5 to update the chosen model.

Step 1 is performed by well-known methods. It requires a knowledge of the spatial distribution of such rock parameters as rock type, thickness and disposition: porosity and permeability. The initial models of those parameters are developed at the exploratory drilling stage based upon seismic and well log data.

In order to carry out step 2, the production rates and integrated production volume of the various hydrocarbon fluids obtained from the reservoir, the injection fluid types, rates and integrated injection volume into the reservoir and the well pressure obtained during production and during well tests must be monitored and recorded. The reservoir model is refined, using the process of history matching, to reflect the current status of the spatial distribution of various fluids in the reservoir matrix. Such fluids include oil, gas, natural water and injected fluids. During this process the model is changed until the predictions of a reservoir simulator match the historically observed production data from the reservoir.

The synthetic seismograms required in step 3 are produced by converting the petrophysical parameters of the reservoir model to their visco-elastic counterparts, and then predicting the seismic responses. This should be done using the best available known techniques.

The seismic surveys of step 4 may be carried out by any known method which produces high quality seismic data. It is important that the data are collected in such a way that the seismic waveforms from different surveys can be directly compared, either immediately or after mathematical processing to remove or compensate for the effects of inaccuracies in positioning and for other differences in the data caused by factors other than reservoir fluid movement.

In the final step, the observed seismic data are used to help resolve any remaining ambiguities in the reservoir model. During this process the competing models are compared and validated dependent upon how well the predictions from a synthetic seismogram generator for each model match the observed seismic data from the reservoir zone. Then the model of the reservoir is modified until the forecasted synthetic seismic response agrees with the observed seismic data and/or the differences in the synthetic seismic response agrees with the observed seismic differences.

The sequence may be continued throughout the productive life of the reservoir.

An object of this invention is to provide a method for efficient management of the recovery of petroleum compounds from a petroleum reservoir.

Another object of this invention is to obtain sufficient physical properties of the reservoir to enable efficient recovery of petroleum compounds from a petroleum reservoir.

A further object of this invention is to combine the prior art method of employing a reservoir model and reservoir simulation with seismic detection to provide detailed inter-well knowledge of the physical attributes of a reservoir.

DETAILED DESCRIPTION OF THE PREFERRED EMBODIMENT

The production of hydrocarbons from a petroleum reservoir is often characterized as occurring in three phases. In the first or primary production phase, hydrocarbons are recovered at the surface through one or more wells either using the intrinsic pressure in the producing zone or by direct pumping. During this phase, the displaced hydrocarbons are replaced by water that occurs naturally in the subsurface formation, or by gas that may have occurred naturally in the subsurface formation.

In the secondary recovery phase, selected fluids are injected into the formation, through specially equipped wells, to aid the replacement process.

In the tertiary recovery phase, additional steps are taken to enhance the recovery of hydrocarbons and to aid the fluid replacement process. These steps may include the injection of special hydrocarbon solvents as well and other selected fluids into the formation. Further, in-situ thermal agitation such as the injection of steam and the ignition of the hydrocarbons may be employed.

In order to produce the hydrocarbons as efficiently as possible during each of these stages, it is important to know the distribution of the fluid in the reservoir at any time during the production process.

The first step in obtaining this knowledge is to make an initial reservoir model, preferably before production begins. Suitable reservoir model techniques are taught in "Porosity Prediction From Seismic Data" by G. T. Angeleri and R. Carpi Geophysical Prospecting 30 (1982), "Petroleum Reservoir Simulation" by Khalid Aziz and Antonin Settari, (1979), Applied Science Publishers, and in "Reservoir Engineering and Conformal Mapping of Oil and Gas Fields" by William Hurst (1979), Petroleum Publishing Company. As described therein, the initial model requires information from well logging, seismic studies and pressure measurements.

Using techniques taught in the same references, the model can be updated as production progresses by using a well-known iterative process known as history matching. This involves predicting production using reservoir simulation, then attempting to match these predictions to the observed production data. The reservoir model is changed until the simulator predictions match the historical data.

These prior art techniques often produce a grossly inaccurate model, or even several models that could fit the observed production data. The method of the present invention is used to choose the correct model between competing models and to greatly improve the accuracy of the model before the information is used to manage the production from the reservoir.

First, synthetic seismograms are prepared for the initial and subsequent models. This is done using the best available techniques. The petrophysical parameters contained in each model are converted to their viscoelastic counterparts by the application of the empirical and/or theoretical equations of reservoir engineering and rock physics disciplines (see for example "Microcomputer Programs for Petroleum Engineers" Vol. 1 by R. L. McCoy, 1983, Gulf Publishing Co. and "Biot Consistent Elastic Moduli of Porous Rocks: Low Frequency Limit" by Leon Thomson, Geophysics 50 December 1985). Hence each of the competing petrophysical reservoir models may be converted to a visco-elastic version of the same situation.

The synthetic seismic responses predicted for each of these visco-elastic models may be computed using standard techniques such as are described in "Theoretical Reflection Seismograms for Elastic Media" by B. L. N. Kennett, Geophysical Prospecting 27 (1979).

In an advance over the prior art, the synthetic seismograms for the initial and a subsequent reservoir model are then differenced. The differential synthetic data provide a considerably enhanced method of detecting the response to postulated fluid movement as compared to the use of a single synthetic seismogram. This is because significant causes of error in a single synthetic seismogram, such as error in the structural configuration of the reservoir or error in the initial estimates of water saturation, are significantly reduced when the differences are used. This is particularly important when synthetic seismograms are used to examine the effects of fluid change or movement within the reservoir model.

Even though using differential synthetic seismic data provides an improvement over the prior art, it is still dependent upon the accuracy of the initial reservoir model. There are several important factors in making that model that cannot be determined to a reasonable degree of certainty, such as permeability of the reservoir rocks, and this can lead to serious inaccuracies in the model. The present invention provides a method of updating the reservoir model and predicting fluid movement in the reservoir that reduces the effect of these inaccuracies, by use of differential actual seismic data.

A seismic survey of the reservoir area is carried out in order to make the initial reservoir model. The technique employed for performing the seismic studies is preferably selected from reflection seismology, vertical seismic profiling (VSP) and cross-hole seismology.

Figure 2:
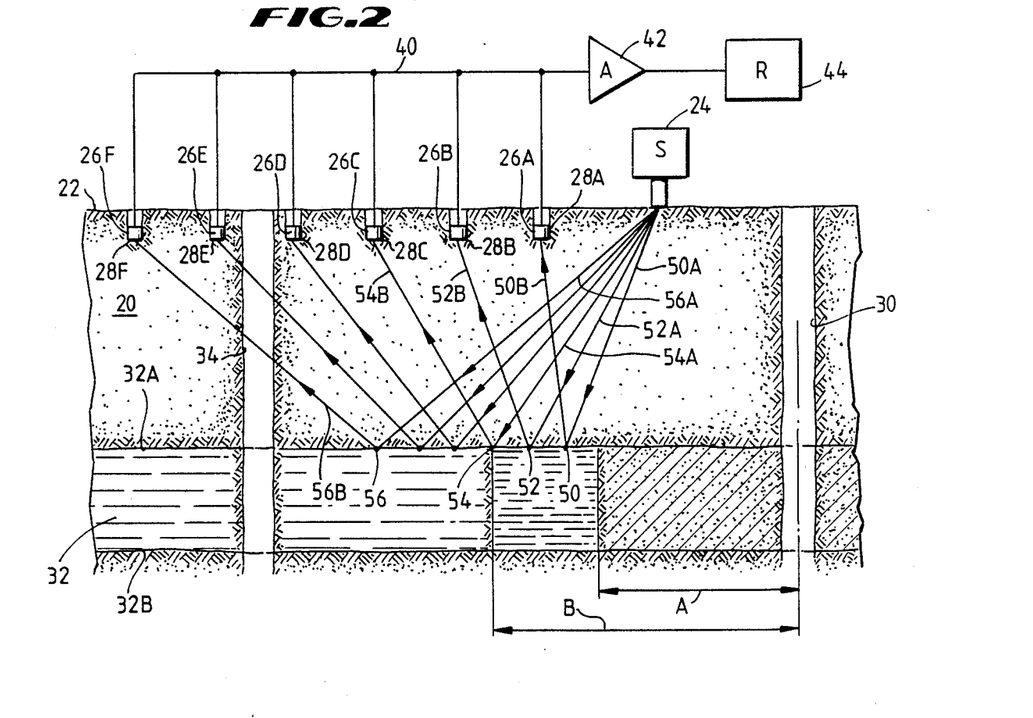
FIG. 2. Schematically illustrates reflection seismology for fluid distribution.

FIG. 2 schematically shows reflection seismology, the preferred embodiment of the seismic survey method for this invention, comprising a portion of the earth 20 including the surface 22. There is a bore hole 30 drilled in a conventional manner from the surface 22 into a reservoir 32. Reservoir 32, bounded by geologic interfaces 32A and 32B, contains a gas saturated zone in an area defined by radius A, an oil saturated zone in the interval between radius A and radius B, and a water saturated zone beyond radius B. The water saturation in the zone beyond radius B may be natural, or may be injected through a second borehole 34.

A plurality of stable seismic sensors, typified by sensors 26A-26F, are permanently fixed in holes 28A-28F located on a uniform grid over, and normally extending beyond, the known limits of the reservoir 32. The seismic sensors may record motion in only the vertical direction or, in some embodiments, in all three directions. The seismic sensors are connected to a central recorder system 44 for the purposes of recording the seismic disturbances produced in response to excitation by the seismic sources 24. The seismic sources 24 are shown near the borehole 30. Sources may be of the vibrator type, and in any event must be capable of creating controlled seismic disturbances from each of a plurality of surface stations in turn. The output of the sensors 26A-26F is transmitted by cable 40 through amplifier 42 to recorder 44. The seismic instrumentation is conventional, well known, and is used in the conventional manner. The seismic data collection system may be of the type shown in U.S. Pat. No. 4,408,307 "Optical Transmission of Digital Seismic Data" issued on Oct. 4, 1983, incorporated herein by reference.

FIG. 2 also shows rays of the seismic waves produced by the source 24, such as 50A which reflects at point 50 on interface 32A and travels upwardly as ray 50B to sensor 16A, and others similarly reflecting at points 52, 54 and 56 on interface 32A. Of course, there will be similar reflections for each of the geologic interfaces beneath the survey area.

Figure 3A:
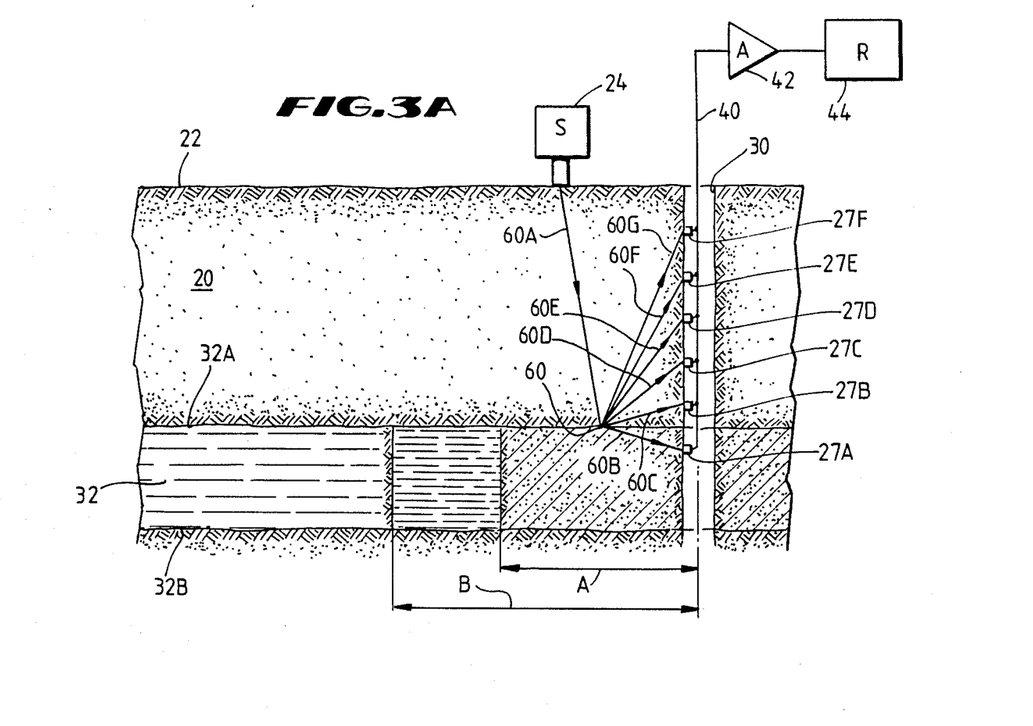
FIG. 3a. Schematically illustrates one configuration of vertical seismic profiling for fluid distribution.

In the vertical seismic profiling method of FIG. 3A, a source of seismic energy 24 is used as described above. However, the seismic sensors, typified by sensors 27A-27F, which may be one or three component, are positioned at various intervals in depth down one or more of the boreholes used to recover oil from the producing reservoir or to inject the fluid into the producing reservoir or the boreholes may be observation wells. In FIG. 3A the seismic sensors 27A-27F are positioned down borehole 30. Sensor 27A, which is located within the reservoir 32, receives signal 60A from source 24 as 60B after refraction through the interface 32A, the remaining sensors 27B-27F receive signal 60A reflected from point 60 on interface 32A as reflected signals 60C-60G respectively.

Figure 3B:
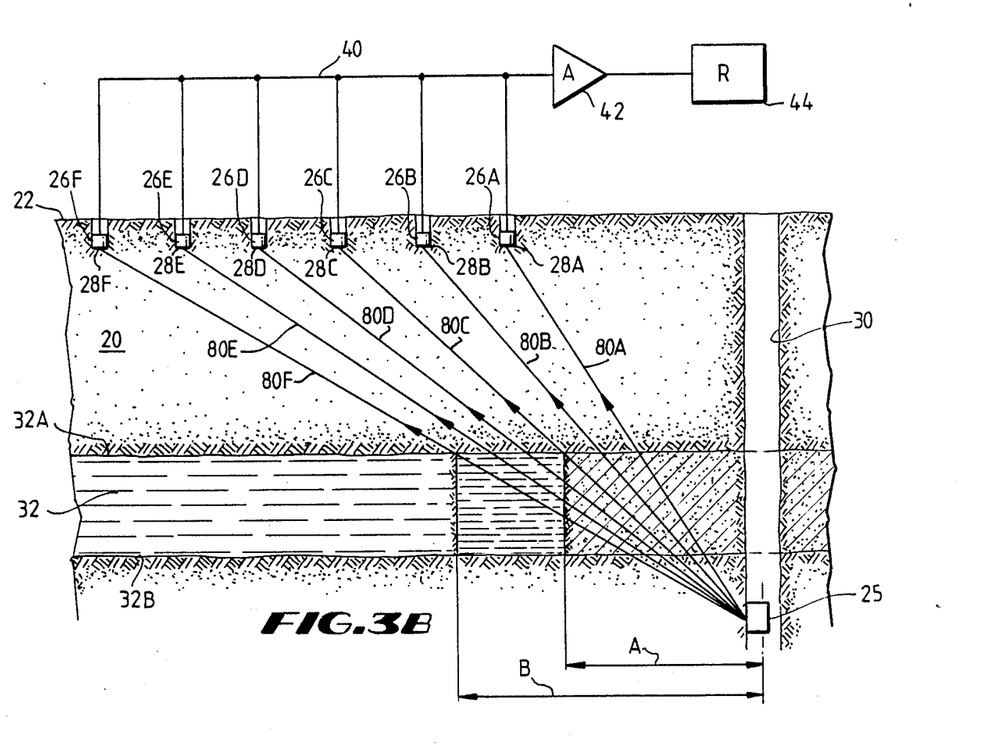
FIG. 3b. Schematically illustrates another configuration of vertical seismic profiling for fluid distribution.

A variation of VSP is a configuration as shown in FIG. 3B wherein the seismic source 25 is placed in the borehole 30 below the lower interface 32B of the reservoir 32 and the seismic sensors 26A-26F are placed at or near the surface 22 as described above in connection with FIG. 2. The signals 80A-80F from source 140 are received respectively by the sensors 26A-26F after refraction through reservoir 32 and intermediate geologic layers.

Figure 4:
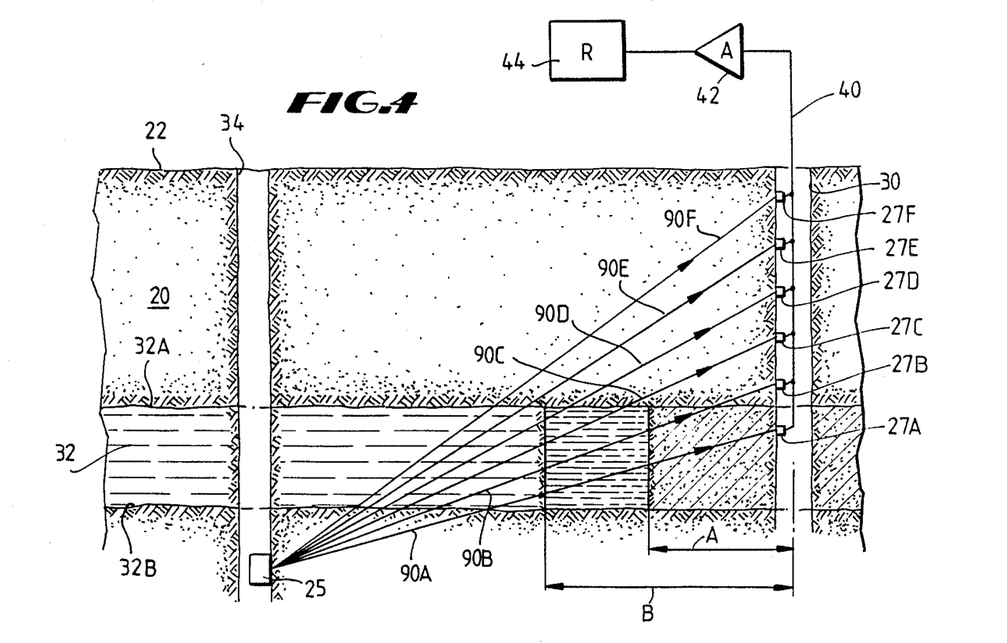
FIG. 4. Schematically illustrates cross-hole seismology for fluid distribution.

In the cross-hole seismology configuration as shown in FIG. 4, suitable sources of seismic energy such as source 25 are placed in one or more of the boreholes such as borehole 34 in the producing reservoir 32, and seismic sensors, such as sensors 27A-27F, are placed in one or more other boreholes, such as borehole 30, in the same reservoir. Signals 90A-90F are received by sensors 27A-27F respectively after transmission through the geological structures between the two boreholes. Alternatively, where there has been horizontal drilling, vertical tomography may be carried out with the source in the borehole and sensors on the surface.

Figure 5:
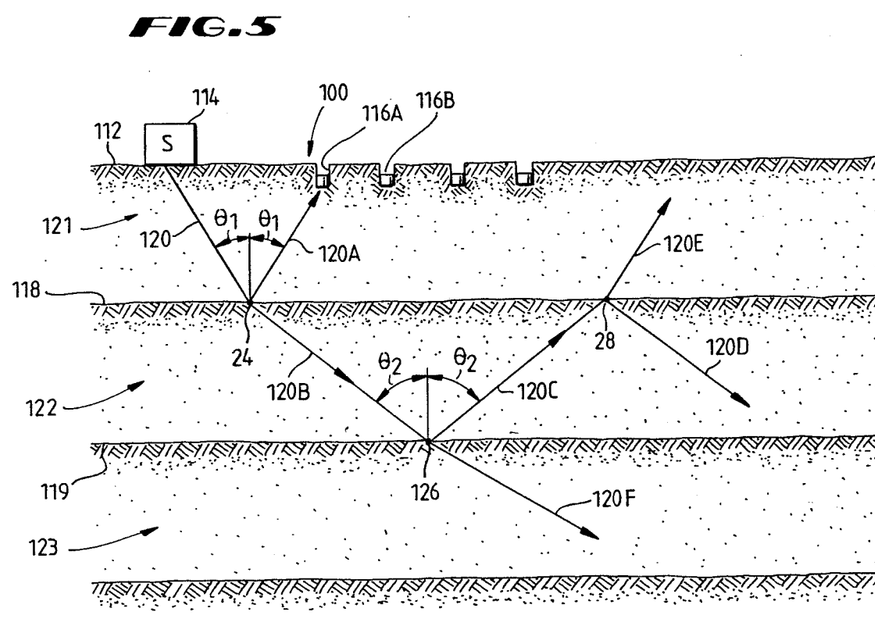
FIG. 5. Schematically illustrates seismic reflection and transmission at an interface.

FIG. 5 illustrates the well-known principles of the transmission and reflection of seismic waves at geologic interfaces in the earth. The earth 100, having surface 112, is shown having three geologic formations 121 at the surface, 122 below the formation 121, with an intervening contact or interface 118, and a third formation 123 in contact with formation 122, at interface 119. A seismic source 114 is set up at surface 112 and a plurality of seismic sensors or receivers typified by sensors 116A, and 116B, are set up spaced from the source 114. By conventional representation, a ray of seismic energy 120 passes downwardly to reflection point 124 at the interface 118, where generally part of the energy is transmitted across the interface 118 as ray 120B, and part is reflected as upwardly reflected ray 120A. Section 1 is defined as the section between interface 118 and surface 112. At interface 119, part of the energy of ray 120B is transmitted at reflection point 126 across the interface 119 as ray 120F, and part is reflected upwardly as ray 120C. Part of the upwardly traveling ray 120C at reflection point 128 is transmitted across the interface 118 from below as ray 120E, and is reflected downwardly as ray 120D. Section 2 is defined as the section between interfaces 118 and 119.

There are several relationships that are well known. First, at the reflection point 124, for example, the angles of incidence and reflection are equal. This occurs at all reflection points such as 124, 126, 128. Second, the division of seismic energy at an interface between the incident wave and the reflected wave is dependent upon the visco-elastic properties of the media separated by that interface.

In particular the reflection coefficient of an interface is a function of a number of the physical and elastic properties of the rocks on either side of the interface. These include rock porosity and cementation, the type of fluid and its density, velocity and viscosity and so on. This dependence on the various rock and fluid properties is the basis for mapping the extent of these fluid distributions using the seismic network.

When reflection takes place at the interface between a rock and a fluid saturated porous rock the reflection coefficient can be quite large. Furthermore there may be a detectable change in this reflection coefficient when the saturating fluid changes. The method of the present invention is sufficiently sensitive to be able to detect relatively small changes in the reflection coefficient, so that the prior art method of image enhancement by gas saturation of the injected fluid is not required.

Another relationship that is relevant to the monitoring of fluid movement in saturated rocks is the effect of aligned microcracks in rocks on shear wave propagation. The effect of the propagation of shear waves through zones of aligned microcracks on the recorded signals is discussed for example in "Microcracks in the Earth's Crust" by S. Crampin and B. K. Atkinson and published in First Break, Vol. 3, March 1985. The effect is to cause shear wave splitting. Detection of this effect requires that motion sensors be capable of detecting motion in three dimensions. Detection of this effect, and in particular, changes in this effect, allow estimation of the direction of crack alignment and hence the preferred direction of fluid flow in the reservoir. Thus by making use of these principles and with the appropriate geometry in observing the character of the seismic waves and functions of their amplitude and phase, much information can be determined relating to the dimension of the reservoir.

Referring again to FIG. 2, as discussed in connection with FIG. 5, the reflection coefficients at each of the reflection points 50, 52, 54 and 56 will depend on the elastic properties of the two formations at the contact plane 32A. During the production life of the producing reservoir 32, the elastic properties of the various points within the reservoir 32 will change, in particular as the distance of the gas saturated zone A changes, and the oil saturated zone from radius A to radius B changes. Consequently, the reflections from the points 50-56 will change throughout the production life of the reservoir. These changes will be detected in the signals received by the sensors 16A-16F and recorded by recorder 44.

The data so collected may be processed using known procedures for two dimensional or three dimensional processing of seismic data. Reference is made to the text books "Seismic Exploration Fundamentals" by J. S. Coffeen, (1978) Petroleum Publishing Company, and "Reflection Seismology" by K. W. Waters, (1981) John Wiley. These two texts are incorporated herein by reference and fully describe the well known, prior art seismic data processing. It is important that the data from each seismic survey is processed in exactly the same way.

A second seismic survey is carried out at the time that the subsequent reservoir model is to be constructed, in order to provide information on the changes in fluid location and saturation from the initial survey.

In some situations it may be possible for successive seismic surveys over the reservoir to identify areas of fluid saturation change even though the seismic surveys are not collected in exactly the same location. This can happen when a gas reservoir is being monitored, since the reflection coefficient associated with gas reservoirs is usually sufficiently large to enable gas to be identified directly from a single seismic survey.

In general, however, to identify fluid saturation change it will be necessary to directly compare seismic data collected on different dates in exactly the same location. This direct comparison is required since the changes in seismic response caused by changes in reservoir fluid saturation are small and are naturally superimposed upon the much larger seismic response of the basic geology of the reservoir.

Direct comparison of two or more surveys of seismic data collected in exactly the same location over the reservoir at different dates enables the effects caused by the constant reservoir parameters to be differentiated from those due to those parameters which are varying. Direct comparison as described herein enables the system to determine in which areas the fluids have varied between successive surveys. This information when compared to previous predictions and observations enables the fluid saturation distributions contained in the reservoir simulation model to be validated accurately.

Comparison of seismic data obtained at different times can be carried out in several different ways. The most accurate, and therefore the preferred way is by wave field subtraction, in which the wave forms for the two surveys are subtracted, thus providing complete common-moding. Wave field subtraction can only be carried out if, for each seismic survey, the seismic sources occupy exactly the same positions and generate exactly the same seismic signals and that the seismic receivers occupy exactly the same positions. This applies to all field collection geometries including those described in detail in FIGS. 2, 3a, 3b, and 4.

Even though every effort is taken to ensure exact duplication of experimental procedure, some conditions beyond the control of the operator may cause spurious differences between seismic surveys i.e those not related to fluid changes in the reservoir of interest.

These conditions include but are not limited to:
(a) Errors in the relative positioning of the different seismic surveys;
(b) Differences in ambient noise, source generated noise, receiver coupling;
(c) Differences in near surface conditions: different near surface attenuation, different near surface velocities or structure (e.g. shifting sand dunes in desert environments, or tidal variations in marine environments), different surface reflection coefficient giving different multiple reflections;
(d) Different streamer or source depths or positions;
(e) Different sources and/or receivers;
(f) Different recording instruments;
(g) Effects of production of upper reservoirs on the response of deeper reservoirs.

Before direct comparison of the seismic data sets by wave field subtraction may take place these effects must be compensated for. The effects that must be compensated for may be divided into two classes:
1. The effects of inaccuracies in positioning of seismic surveys;
2. The differences in the data when the spatial registration of the two surveys is 100% accurate—as in the case when the geophones are permanently buried in a stable surface layer or when compensation for survey positioning has already been performed.

The preferred method for achieving these compensations is as follows:
1. Removal of or compensation for the effects of inaccuracies in positioning of seismic surveys.

The method of the present invention for detecting changes in a reservoir's saturating fluid requires the differencing of two or more seismic surveys conducted over the reservoir area. The method requires that the surveys, or at least those parts to be differenced, are colocated.

There is however considerable risk that, during the time period between the surveys, some of the permanently fixed measuring equipment is moved or that some of the movable equipment is not exactly relocated for the second and subsequent surveys. In the case of most marine surveys and some land surveys, none of the equipment will be permanently fixed in the vicinity of the reservoir. Although every effort is made to be as accurate as possible in surveying and navigation, experience shows that a slight error in positioning between surveys may lead to significant apparent changes in seismic response which may be erroneously interpreted as changes in the reservoir's fluid content which did not in fact occur. The method disclosed here makes use of the seismic data resulting from the two or more seismic surveys to identify and remove the effects of any inaccuracies of survey positioning.

The positioning error will likely be much larger than the spacing between adjacent common depth points (CDP) and, if the seismic data are collected as part of a three dimensional (3D) survey, probably larger than a spacing between adjacent lines of CDP's.

The two surveys will need to be shifted to align them to the same spatial coordinates before monitoring studies may begin on the reservoir zone. The positional shifting required may be along the line direction and in the crossline direction. Additionally time or phase shifts, independent of the positional shifts, may be required to compensate for source and receiver variations between the two surveys. Further compensation may be required in the marine environment for changes in tidal and sea-state, whereas in the land environment changes in near surface conditions must be compensated.

A space-variant X,Y shift must be determined for each CDP of the monitor survey so as to align it with previous seismic surveys. A space-variant phase and/or time shift operator is also required due to variations in the apparent source and receiver signatures between the two surveys. Accuracy of the X,Y shifting operation will depend on the phase shift required to match the two vintages of data since the two are highly coupled. Efforts should be taken to minimize these phase shift variations so that the positioning accuracy may be optimized.

Preferably, the method disclosed for this relocation technique will be applied to partially processed seismic data, in particular data at a pre-migration stage.

There are essentially six steps involved in the method as follows:

(a) Remove high frequency cross-line time and/or phase variations between the individual lines of each seismic survey individually.

The data for each CDP from each single line are correlated against the data from the neighboring lines resulting in a two dimensional field of correlation functions for each CDP. The process is repeated for each CDP on each line. Surfaces are fitted to the correlation functions to determine the required static shift for each CDP. The resulting two dimensional field of static shifts is filtered to determine the high frequency part. Each point in this high frequency portion of the static field represents the static shift to be applied to the individual CDP appropriate for that point. The static shifts so determined are applied to the trace data.

(b) For each survey individually, after application of the high frequency static shifts determined in (a) above, separate flat, or substantially flat, seismic events from those exhibiting dip.

This may be accomplished by, but is not limited to, the method of designing and applying a suitable two or three dimensional filter. The results of this operation are a 'flat' and a 'dipping' data set for each seismic survey.

(c) Determine the predominant phase and time shifts between the seismic surveys.

This is accomplished by computing numerical operators from the separated 'flat' data of the two seismic surveys, the operators being such that their application to a trace from one seismic survey results in a trace substantially similar to the seismic trace observed in the other seismic survey at the same nominal position.

(d) Apply the phase and time shift operators determined in (c) above from the 'flat' data sets to the appropriate 'dipping' data set separated in (b) above.

Following this step the two dipping data sets will have substantially the same seismic wavelet superimposed upon the same dipping seismic response to the local geologic conditions. They will however still exhibit any uncorrected positional differences between the surveys.

(e) The positional differences between the surveys are computed.

This is accomplished by cross correlation of each trace from the dipping version of the latest survey with a subset of the traces of the dipping version of the previous survey. This subset contains all traces which are nominally located within a circle whose center is the position of the trace from the latest survey and whose radius is equal to the expected absolute error in positional (navigational, surveying or uncontrolled) accuracy. A surface is fitted to the resultant correlation functions and an optimum shift determined. The process is repeated for each trace in the latest seismic survey. The optimum shifts for all traces of the latest survey are analyzed so as to be consistent with expected trace to trace positioning. For example, in the marine environment it is well known that trace positions monotonically increase along a seismic line and do not, in general, turn back on themselves, so a sequence of optimum shifts predicting and/or requiring such a physically unrealizable sequence of positioning will not be allowed.

(f) Compensation is made for the positional differences between the surveys determined in (e) above.

This may be accomplished by assigning to each observed trace in the latest seismic survey an X,Y position equal to the sum of its nominal position and the determined optimum shift for that trace, and numerically interpolating amongst the observed traces of the latest seismic survey, at their assigned positions, so as to produce traces at the nominal positions of the traces in the previous seismic survey.

This interpolation may be performed in many ways including, but not limited to, the application of two dimensional Fourier transforms or by pattern recognition techniques.

2. Remove or compensate for differences in the data when spatial registration of the two surveys is 100% accurate.

In the preferred embodiment of the calibration technique used to remove or compensate for these differences, mathematical operators are designed from data reflected from interfaces shallower than the reservoir of interest, in such a way as to remove from the second seismic survey's data only those effects not attributable to the fluid changes in the reservoir of interest. Dependent upon the exact nature of the case in point these operators may be appropriate for application to prestack data, or post stack data or post migration data. This does not imply that the analysis should necessarily be limited to only one of these sets of data. If prestack operators are to be designed then they will implicitly contain expected changes in amplitude vs. offset effects caused by different fluids in the reservoir and/or different collection geometries.

It is possible that there will exist systematic and predictable differences even amongst the calibration operators appropriate for the events above or below the reservoir of interest, one reason for such differences being the existence of a producing reservoir located between two of the chosen marker events above or below the reservoir of interest. If such a case is encountered then its effects should be minimized by either predictive or statistical numerical modelling and removal of the effect before the data are subjected to the above mentioned quantitative comparison.

The application of these calibration/registration techniques enables the required direct comparison of two independent seismic surveys collected over the same reservoir at different calendar times.

A less accurate method, which is still an improvement over the prior art, is to normalize the reflection amplitude data and to compute the differences between the normalized data. The normalization is carried out by assuming that the reflection coefficients of all underlying and overlying strata are unchanged. The energy (RMS amplitude) in the new survey's received response is scaled to the average determined from previous surveys in the same interval. The same multiplying factor is applied to the data from the reservoir horizon(s) which may have changed due to saturation effects. The amplitude changes may be used to estimate saturation change. It is still necessary to have the seismic sources in the same positions and generating the same seismic signals, and to have the seismic receivers occupying the same positions or to compensate for any changes in position or signal form, but it is not necessary to provide the very rigorous compensation for error causing conditions needed for wave field subtraction, as described above.

In this case:

a: Choose marker seismic reflection horizon(s) above the reservoir of interest; and/or b: Choose a time gate of seismic data around the reservoir of interest.

Using a reservoir model suitably updated to include fluid saturation changes which have taken place between the times of the seismic surveys (this may include but is not limited to the results of reservoir simulation, which predicts new properties of the reservoir), determine the expected changes in the reflection properties of the reservoir. These may include, but are not limited to, changes in seismic amplitude (including changes in the variation of amplitude with offset), and changes in the reflected seismic wavelet caused by changes in reservoir properties.

and/or c: Choose marker seismic reflection horizon(s) below the reservoir of interest.

Using a reservoir model suitably updated to comprehend fluid saturation changes which have taken place between the times of the seismic surveys (this may include but is not limited to the results of reservoir simulation, which predicts new properties of reservoir), determine the expected changes in the transmission properties of the reservoir. These may include, but are not limited to, changes in seismic travel time through the reservoir, changes in seismic wavelet caused by changes in reservoir properties.

Data above, at and below the reservoir of interest between the surveys are compared to ensure that the observed and predicted changes are consistent throughout the data set. This may be done by explicitly removing all the expected changes from the second (and all subsequent surveys), or implicitly including their effect in the analysis technique, or removing only those effects not attributable to the reservoir of interest and explicitly analyzing all other seismic differences.

In these ways observed changes in seismic response between two seismic surveys may be used to determine changes in a reservoir's fluid saturation.

The preferred method of estimating the changes in fluid distribution between the two surveys is to match the differential synthetic data to the differential seismic data, which should provide a comparison of the changing characteristics only. This may require adjusting factors in the model which relate to fluid factors such as the water saturation profile or the fluid type. This matching of the differential data also provides a method of estimating the mean reservoir permeability.

Where the history matching process described above does not result in a single suitable model, matching the synthetic data to the seismic data enables a choice to be made amongst competing models. Once the best model is selected, its accuracy is improved by use of information derived from the comparison of the seismic and synthetic data. The reservoir model is updated so that the estimated change in fluid distribution predicted by the reservoir simulator matches the estimated change derived from matching the differential data as described above.

Figure 1:
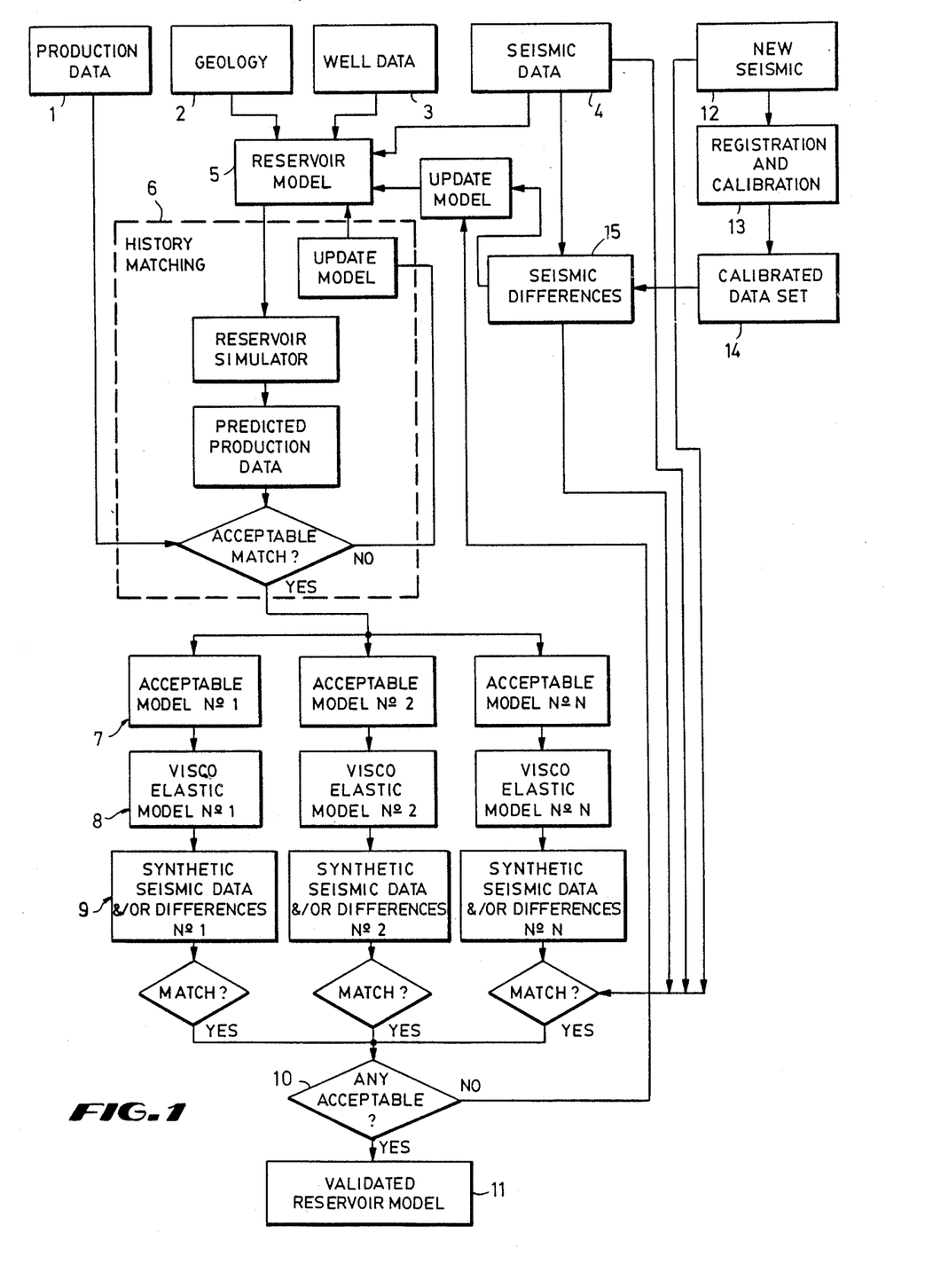
FIG. 1. Schematically illustrates the closed loop system of this invention.

The reservoir monitoring system described above may be summarized by the flow chart schematically illustrated in block form in FIG. 1.

The initial reservoir model 5 represents the integration of all available production 1, geologic 2, well 3, and seismic 4 information. It contains structural, lithologic, fluid and petrophysical information which at this stage is, in general, very imperfectly known.

This initial model is then validated as far as possible by the iterative process, known as history matching 6, wherein the model is changed until the predictions of a reservoir simulator match the historically observed production data from the reservoir. This process, which improves the reliability of the reservoir model, may however result in several competing reservoir models 7a, 7b, 7c . . . being considered as likely representations of the true subsurface situation. The observed seismic data may now be used to resolve these ambiguities as follows.

The petrophysical parameters contained in each model are converted to their visco-elastic counterparts by known techniques. Hence each of the competing petrophysical reservoir models 7a, 7b, . . . may be converted to a visco-elastic version of the same situation 8a, 8b, . . . The synthetic seismic responses 9a, 9b, . . . predicted for each of these visco-elastic models 7a, 7b ... are computed using standard techniques.

Each synthetic seismic response so derived may be compared 10 to the observed seismic data 4. If a suitable match is found then the appropriate petrophysical model is selected as the most likely representation of the subsurface situation.

If no such overall satisfactory match is found then the process returns to the history matching 6 stage via a model update 16 where the added constraints derived from the current and previous rounds of seismic feedback validation may be incorporated into the reservoir model. These constraints include: the areas within which the reservoir has or has not changed and, for those areas where the reservoir appears to have changed, the likely magnitude of fluid saturation changes to be expected. The system is iterated until a consistent reservoir model 11 is obtained.

The consistent reservoir model 11 so found, which may be used for defining production strategy, replaces the initial reservoir model 5 for the next outer loop of the complete seismic feedback system.

As hydrocarbon production from the reservoir progresses it is necessary to update the detailed reservoir model so as to ensure it continues to reflect the true situation. This updating process will require the collection of more production information 1 and more history matching 6. New seismic data 12 should also be collected over the reservoir and the process described above will be repeated to ensure that any new reservoir description is supported by the new seismic data.

In addition to the comparison 10 of the seismic data with the predictions of the reservoir models it will, as discussed above, be necessary in most circumstances to directly compare the different vintages of seismic data 4, 12.

This direct comparison requires the spatial registration of the two seismic data sets, followed by the calibration of the surveys to one another using the data from the area of the subsurface which is not expected to change between the surveys. The preferred registration and calibration techniques are described in detail above.

Application of appropriate registration and calibration techniques to the results of the second seismic survey produces a calibrated data set 14 which may be directly compared to the results of previous seismic experiments 4 so as to identify significant changes 15 between the surveys. These significant changes in seismic response are used to determine the constraints on the probable variations in the reservoir's fluid configurations which have occurred in the time period between the collections of the two seismic surveys. These constraints include: the areas within which the reservoir has or has not changed and, for those areas where the reservoir appears to have changed, the likely magnitude of fluid saturation changes to be expected. This information is used to update the reservoir model's parameters.

The observed changes in seismic response are compared to the differences between synthetic seismograms derived from the previous and updated reservoir models and are thus used to validate the predicted changes in the reservoir model or, if a significant discrepancy is detected during this comparison, they may be used to select an alternate update. The system is iterated until a consistent reservoir model 11 is obtained. Detailed maps of fluid saturations or changes in saturation may be produced from the validated models.

The entire procedure, or set of procedures, may be repeated using the different competing reservoir descriptions to determine the optimum choice of reservoir model, thus giving the most accurate saturation maps.

Seismic data are collected as described above. The data so collected are processed using known procedures. The data so processed are compared with the previously collected data and processed in an identical manner from a first or previous experiment. The comparison or difference is further enhanced by minimizing the difference in the data corresponding to those regions of the subsurface 10 that have not changed by performing the registration and/or calibration procedures described above in this disclosure.

This information, when combined with reservoir modeling and simulation as described in detail above, is useful in monitoring the natural modification of the field during the primary phase or for determining the distribution of fluids, including the injected fluids, in the second and tertiary phases of the oil field production. This information may also be used to monitor the burn front associated with in situ thermal recovery of heavy hydrocarbons and tars.

The invention described herein provides a new method of reservoir management by enabling accurate updating of the original model to be consistent with all available data. Use of this new consistent model allows accurate predictions of reservoir activity to be made. The stream lines of the reservoir may be determined and action taken, where necessary, to provide better petroleum recovery. Measuring the pressure and providing such measurements to the reservoir simulation is very important for predicting stream lines.

The addition of the seismic experiments' model validation and feedback systems, disclosed herein, enable the system to accurately determine the petroleum compounds that should be removed currently and in the future.

It is contemplated that those skilled in the art may alter the steps of this inventive method without departing from the spirit and scope of this invention which is limited only by the appended claims.

What is claimed is:

1. A method of managing fluid production from a fluid reservoir in a geological formation, comprising the steps of;
   (a) constructing a model of the petrophysical characteristics of the reservoir at a first time;
   (b) updating the model to represent the petrophysical characteristics of the reservoir at a second time;
   (c) computing synthetic seismograms for the model at the first and second times;
   (d) computing the differences between the synthetic seismograms for the model at the first and second times;
   (e) obtaining seismic waveforms for the reservoir area at the first and second times, the waveforms being collected and processed so as to compensate for differences between the waveforms at the first and second times caused by factors other than movement of fluid in the reservoir;
   (f) comparing the seismic waveforms and computing the difference between the waveforms at the first and second times;
   (g) determining the change in fluid distribution in the reservoir between the first and second times by comparing the differenced synthetic seismograms to the differenced seismic waveforms;

(h) from the change in fluid distribution in the reservoir between the first and second times obtaining an estimate of mean reservoir permeability;
(i) using the results of steps (g) and (h) to improve the accuracy of the model; and
(j) using the improved model in the management of production of fluid from the reservoir.

2. The method of claim 1, wherein the model is updated by using history matching based on production rates and integrated production volume of fluid obtained from the reservoir and the types, rates of injection and integrated injection volume of any fluids injected into the reservoir.

3. The method of claim 1, wherein the synthetic seismograms are computed by converting the petrophysical parameters of the model to their visco-elastic counterparts and calculating the seismic responses of such visco-elastic parameters.

4. The method of claim 1, wherein the seismic waveforms are obtained by processing signals received by a plurality of seismic detectors located in known positions in the vicinity of the reservoir, the signals originating from at least one seismic energy source spaced from the seismic detectors and located at a known position in the vicinity of the reservoir.

5. The method of claim 4, wherein at each of the first and second times the seismic detectors are located at substantially the same positions, the seismic energy source is located at substantially the same position and generates signals with substantially the same characteristics.

6. The method of claim 4, further comprising the step of processing the seismic signals received by the seismic detectors to compensate for the effect of any differences in the positioning of the seismic detectors and seismic source between the first and second times and for the effect of any differences in the seismic signal characteristics between the first and second times.

7. The method of claim 6, further comprising the step of processing the signals received by the seismic detectors to compensate for the effect of any changes in the reservoir area between the first and second times other than those caused by the change in fluid distribution.

8. The method of claim 1, wherein the seismic waveforms are compared directly.

9. The method of claim 1, wherein the seismic waveforms are compared by normalizing the reflection amplitude data and computing the differences between the normalized data.

10. The method of claim 1, further comprising the step of repeating steps (b) through (i) at further times during the production of fluid from the reservoir.

11. A method for improving a model of the petrophysical characteristics of fluid reservoir in a geological formation constructed at a first time, comprising the steps of;
 (a) updating the model to represent the petrophysical characteristics of the reservoir at a second time;
 (b) computing synthetic seismograms for the model at the first and second times;
 (c) computing the differences between the synthetic seismograms for the model at the first and second times;
 (d) obtaining seismic waveforms for the reservoir area at the first and second times, the waveforms being collected and processed so as to compensate for differences between the waveforms at the first and second times caused by factors other than movement of fluid in the reservoir;
 (e) comparing the seismic waveforms and computing the difference between the waveforms at the first and second times;
 (f) determining the change in fluid distribution between the first and second times by comparing the differenced synthetic seismograms to the differenced seismic waveforms;
 (g) from the change in fluid distribution in the reservoir between the first and second times obtaining an estimate of mean reservoir permeability; and
 (h) using the results of steps (f) and (g) to improve the accuracy of the model.

12. The method of claim 11, wherein the model is updated by using history matching based on production rates and integrated production volume of fluid obtained from the reservoir and the types, rates of injection and integrated injection volume of any fluids injected into the reservoir.

13. The method of claim 11, wherein the synthetic seismograms are computed by converting the petrophysical parameters of the model to their visco-elastic counterparts and calculating the seismic responses of such visco-elastic parameters.

14. The method of claim 11, wherein the seismic waveforms are obtained by processing signals received by a plurality of seismic detectors located in known positions in the vicinity of the reservoir, the signals originating from at least one seismic energy source spaced from the seismic detectors and located at a known position in the vicinity of the reservoir.

15. The method of claim 14, wherein at each of the first and second times the seismic detectors are located at substantially the same positions, the seismic energy source is located at substantially the same position and generates signals with substantially the same characteristics.

16. The method of claim 14, further comprising the step of processing the seismic signals received by seismic detectors to compensate for the effect of any differences in the positioning of the seismic detectors and seismic source between the first and second times and for the effect of any differences in the seismic signal characteristics between the first and second times.

17. The method of claim 16, further comprising the step of processing the signals received by seismic detectors to compensate for the effect of any changes in the reservoir area between the first and second times other than those caused by the change in fluid distribution.

18. The method of claim 11, wherein the seismic waveforms are compared directly.

19. The method of claim 11, wherein the seismic waveforms are compared by normalizing the reflection amplitude data and computing the differences between the normalized data.

20. A method of determining fluid distribution changes over time in a fluid reservoir in a geological formation, comprising the steps of;
 (a) constructing a model of the petrophysical characteristics of the reservoir at a first time;
 (b) updating the model to represent the petrophysical characteristics of the reservoir at a second time;
 (c) computing synthetic seismograms for the model at the first and second times;
 (d) computing the differences between the synthetic seismograms for the model at the first and second times;

(e) obtaining seismic waveforms for the reservoir area at the first and second times, the waveforms being collected and processed so as to compensate for differences between the waveforms at the first and second times caused by factors other than movement of fluid in the reservoir;

(f) comparing the seismic waveforms and computing the difference between the waveforms at the first and second times;

(g) from the difference between the seismic waveforms at the first and second times estimating the change in fluid distribution in the reservoir between the first and second times; and (h) determining the changes in fluid distribution between the first and second times by comparing the differenced synthetic seismograms to the differenced seismic waveforms.

21. The method of claim 20, wherein the model is updated by using history matching based on production rates and integrated production volume of fluid obtained from the reservoir and the types, rates of injection and integrated injection volqume of any fluids injected into the reservoir.

22. The method of claim 20, wherein the synthetic seismograms are computed by converting the petrophysical parameters of the model to their visco-elastic counterparts and calculating the seismic responses of such visco-elastic parameters.

23. The method of claim 20, wherein the seismic waveforms are obtained by processing signals received by a plurality of seismic detectors located in known positions in the vicinity of the reservoir, the signals originating from at least one seismic energy source spaced from the seismic detectors and located at a known position in the vicinity of the reservoir.

24. The method of claim 23, wherein at each of the first and second times the seismic detectors are located at substantially the same positions, the seismic energy source is located at substantially the same position and generates signals with substantially the same characteristics.

25. The method of claim 23, further comprising the step of processing the seismic signals received by the seismic detectors to compensate for the effect of any differences in the positioning of the seismic detectors and seismic source between the first and second times and for the effect of any differences in the seismic signal characteristics between the first and second times.

26. The method of claim 25, further comprising the step of processing the signals received by the seismic detectors to compensate for the effect of any changes in the reservoir area between the first and second times other than those caused by the change in fluid distribution.

27. The method of claim 20, wherein the seismic waveforms are compared directly.

28. The method of claim 20, wherein the seismic waveforms are compared by normalizing the reflection amplitude data and computing the differences between the normalized data.

29. The method of claim 20, further comprising the step of repeating steps (b) through (h) at further times during the production of fluid from the reservoir.

30. A method of estimating changes in fluid distribution caused by fluid removal from a reservoir in a geological formation, comprising the steps of ;
(a) locating at least one seismic energy source capable of producing seismic signals with repeatable characteristics at a known position in the vicinity of the reservoir;
(b) locating a plurality of seismic detectors at known positions in the vicinity of the reservoir and spaced apart from the seismic energy source;
(c) operating the seismic energy source at a first time to produce signals with known characteristics and recording the signals received by the seismic detectors;
(d) at a second time, locating the seismic energy source and the seismic detectors in substantially the same positions as the positions said source and detectors occupied at the first time;
(e) at the second time, operating the seismic energy source to produce signals with substantially the same characteristics as the signals produced at the first time and recording the signals received by the seismic detectors;
(f) processing the seismic signals recorded at the first and second times to compensate for the effect of any differences in the positioning of the seismic energy source and the seismic detectors between the first and second times and for the effect of any differences in the seismic signal characteristics between the first and second times;
(g) obtaining seismic waveforms from the processed recorded signals; and
(h) estimating the changes in fluid distribution in the reservoir by comparing the waveforms obtained at the first and second times.

31. The method of claim 30, wherein the seismic waveforms are compared directly.

32. The method of claim 30, wherein the seismic waveforms are compared by normalizing the reflection amplitude data and computing the differences between the normalized data.

33. The method of claim 30, further comprising the step of processing the recorded signals to compensate for the effect of any changes in the reservoir area between the first and second times other than those caused by the change in fluid distribution.

* * * * *